United States Patent [19]

Checcchetti

[11] Patent Number: 4,543,513

[45] Date of Patent: Sep. 24, 1985

[54] METHOD AND AN APPARATUS FOR CONTROLLING A.C. ROTATING MACHINERY POWER PLANTS

[76] Inventor: Maurizio Checcchetti, Piazza Sicilia, 1 - Milano, Italy

[21] Appl. No.: 517,595

[22] Filed: Jul. 27, 1983

[30] Foreign Application Priority Data

Aug. 3, 1982 [IT] Italy ............... 22723 A/82

[51] Int. Cl.[4] ............................... H02P 7/74
[52] U.S. Cl. ................... 318/158; 318/140; 318/149
[58] Field of Search ............. 318/140, 141, 142, 147, 318/149, 151, 153, 154, 156, 157, 158, 144

[56] References Cited

U.S. PATENT DOCUMENTS

| | | | |
|---|---|---|---|
| 3,436,633 | 4/1969 | Hemmenway et al. | 318/158 X |
| 3,470,434 | 9/1969 | Caputo | 318/158 X |
| 3,532,950 | 10/1970 | Jackson | 318/158 X |
| 3,931,555 | 1/1976 | Dohanich et al. | 318/142 X |
| 4,179,729 | 12/1979 | Stanton et al. | 318/158 X |

FOREIGN PATENT DOCUMENTS

| | | | |
|---|---|---|---|
| 43-1332 | 1/1968 | Japan | 318/158 |
| 46-34810 | 10/1971 | Japan | 318/140 |
| 46-40569 | 11/1971 | Japan | 318/141 |
| 47-18494 | 5/1972 | Japan | 318/140 |
| 57-59500 | 4/1982 | Japan | 318/140 |

Primary Examiner—William M. Shoop, Jr.
Assistant Examiner—Bentsu Ro
Attorney, Agent, or Firm—Seidel, Gonda Goldhammer

[57] ABSTRACT

The control of a quantity (voltage, phase) relating to a generator-motor pair in an electric power station is accomplished by generating a pulse sequence associated with the quantity to be controlled, generating a predetermined reference pulse sequence and detecting the relative phase shift between the two pulse sequences. This phase shift, or an integrated value of a number of successive phase shifts, controls a double ramp generator, the sign and slope of which are proportional to the detected phase shift. The integrated signal is employed to vary the magnetic induction of the rotor, i.e., field excitation of the generator, to balance the system.

5 Claims, 5 Drawing Figures

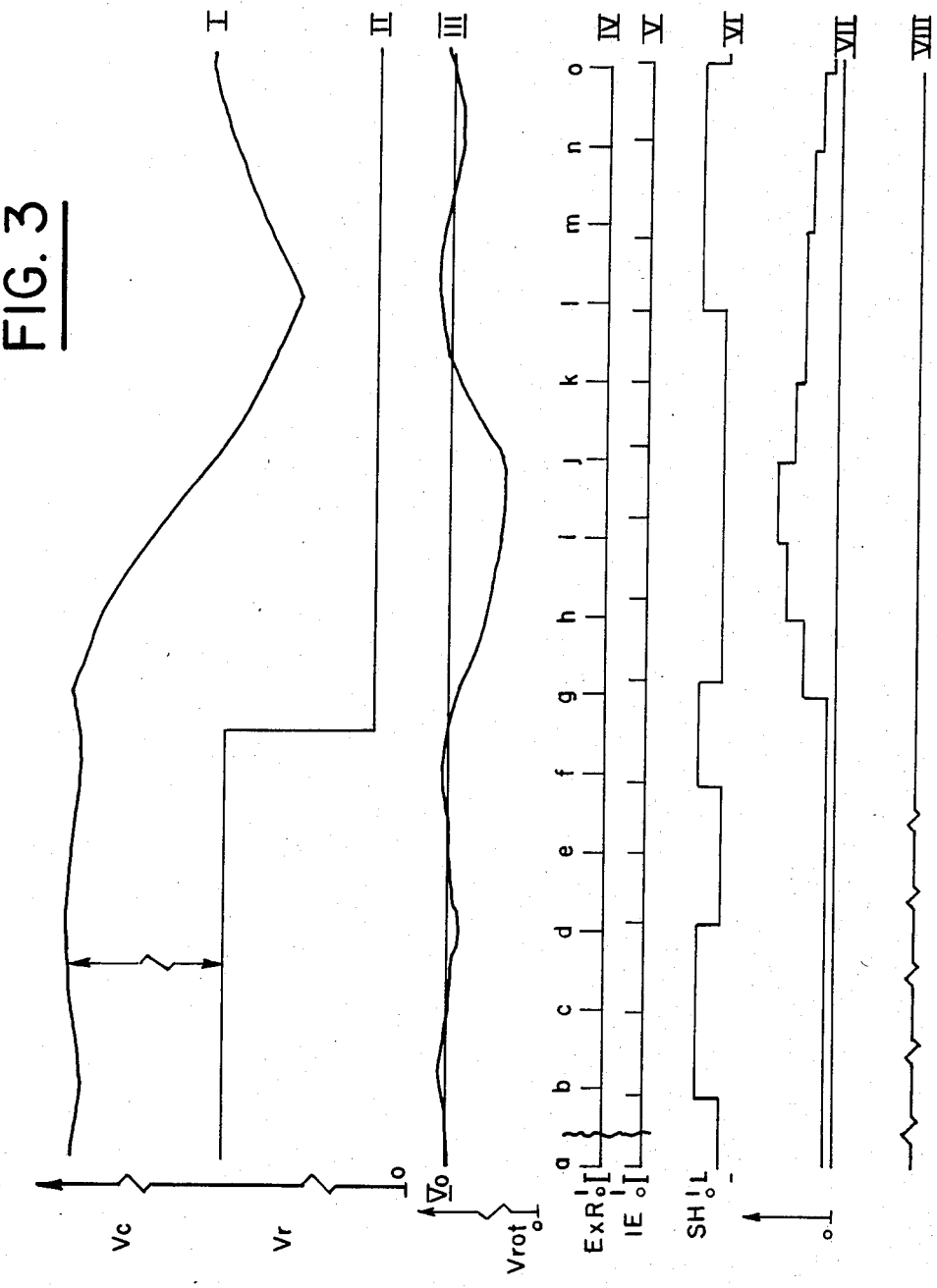

METHOD AND AN APPARATUS FOR CONTROLLING A.C. ROTATING MACHINERY POWER PLANTS

BACKGROUND OF THE INVENTION

This invention relates to a method and an apparatus for controlling power stations wherein each generator is separately phase locked controlled. The control of power plants of the thermal, hydroelectric type, etc. is presently carried out by using as a main control quantity the input power in a generally analog manner, as well as other parameters that nevertheless require rather complex algorithms. Power adjustment must therefore be quick, feasible in a wide range of operating conditions, effective and reliable, considering that several energy conversions and high power values are involved. The relevant apparatuses are therefore rather expensive and attempt to reconcile opposite requirements.

The object of the present invention is a main control system, prevailingly electronic, that directly operates on the generator and by electric signals only for the main control in the short run. This way the secondary adjustment of the input power becomes easier and more effective and by means of an almost digital control.

The invention consists of a method and the relevant apparatus for use in a regulator of the locking type (phase locking, voltage locking, etc.) having features resembling those of a torque converter automatic change gear; i.e., having fixed the input power, if the load increases, the voltage decreases with an increase in the supplied current. This way, any change, e.g. a line voltage variation, provided that it is within predetermined limits, is automatically tracked and corrected very quickly independently of the input power magnitude. Although the input power can be subjected to changes, the reference frequency is maintained rigorously constant with very small phase variations.

In power plants wherein the size is relatively small with respect to the overall line power, the motor power can be fixed and adjusted for better efficiency or for maximum power without any specific feedback loop, or it can be variable (e.g., for hydroelectric stations) or even be moderately unstable. In all of these cases the input power control is limited by the alarm signaling since the instrumentation and the plant apparatuses are limited to the minimum requirement for the plant start and stop. In larger plants, the input power can be slowly proportioned, or programmed, the only aim being to approximately balance (match) the load while avoiding expensive and ineffective control systems. Thereby it is possible to prevent power excesses in standby conditions, to reduce the thermal stresses and to obtain a maximum of temperature and efficiency. Another advantage of the invention resides in eliminating the analog parameters from the feedback loop: the only reference parameters are time and a mechanical angle and both are digitized with high resolution and are substantially stable. The only analog signal is from the regulator output. The invention requires very few components, the performances of which may be only nominal.

In equilibrium conditions the input mechanical power is equal to the supplied electric power that is given by the product of the RMS voltage and the supplied current. The current value only depends upon the line impedance between the generator and the first network junction (i.e., upon the magnitude of the load and the corresponding difference of potential.) In the short run, disregarding the motor characteristics (that for small variations can be considered as supplying a constant torque), the kinetic rotational energy compensates for the difference between the motor power and the electric power by increasing or decreasing. Variations in kinetic energy (i,e., variation of the speed of rotation) can be detected as time difference (phase differences) between a reference pulse and a pulse generated by an encoder on the generator-motor shaft. These time differences allow, according to the invention, quick modification to the generator magnetic field by full electronic control, so as to prevent substantial faults.

If the motor slows down, the input power becomes smaller than the delivered power and, in order to balance the system, it is required to decrease the generator magnetic field, thus reducing the output voltage, the line potential difference and the output current. The field variation is proportional to the phase offset (time difference) between the reference and encoder pulses. To avoid false signals and too high response frequencies, it is preferred to provide means for gradually altering the field, such as a ramp voltage. The hysteresis allows for a certain phase tolerance. To obtain better time responses it is possible to resort to non-linear transfer functions which may be stored in a properly programmed memory, e.g., the integration of a few successive phase shift conditions, etc.

SUMMARY OF THE INVENTION

According to the method of the invention there are generated a sequence of pulses associated with the quantity to be controlled, and a sequence of predetermined reference pulses. The offset between the corresponding pulses of each sequence is detected and the offset value, preferably integrated, is used to generate a ramp signal having a sign and a slope that are proportional to the detected error. By integrating such ramp signal one gets a signal which can be used to modify the value of the generator induction, i.e., field excitation.

BRIEF DESCRIPTION OF THE DRAWINGS

The invention will now be disclosed with reference to some preferred embodiments, together with the attached drawings in which:

FIG. 3 shows some diagrams explaining the method of the invention.

DETAILED DESCRIPTION OF THE PREFERRED EMBODIMENT

Figure 1:
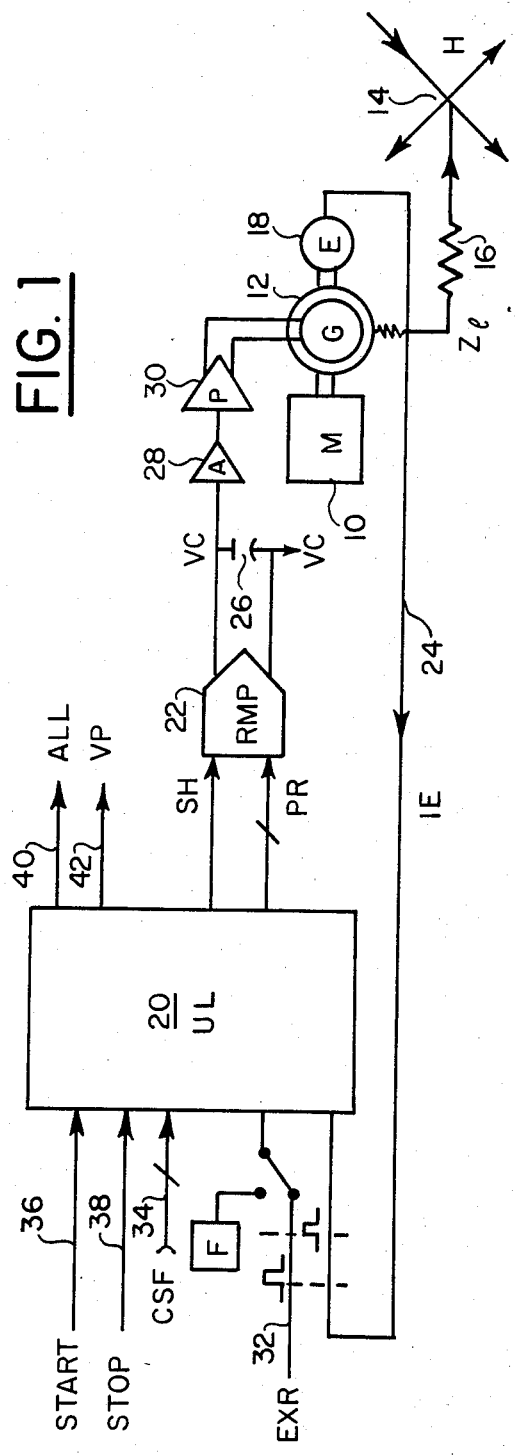
FIG. 1 schematically shows an apparatus according to the invention.

FIG. 1 is a general block diagram showing a motor 10 coupled to a generator 12 feeding a distribution network 14 schematically represented by impedance $Z_e$ accounting for the impedance between the generator and the first network junction N. An encoder 18 is mounted coaxially with the generator 12 and motor 10, generating pulses IE on line 24 that are applied to one input of a logic unit 20. This latter controls a ramp generator 22 charging a capacitor 26 to a voltage that, in turn, controls the induction or magnetic field value of the generator by means of a preamplifier 28 and a power amplifier 30.

The logic unit 20 furthermore receives reference pulses EXR and an offset control signal CSF (formed by a number of bits) on lines 32, 34, respectively, as well as start and stop signals each formed by a single bit on lines 36, 38, respectively.

Among the logic unit 20 outputs there are provided on alarm output ALL on line 40 signaling the maximum phase displacement and an output VP on line 42 signaling that the input power is likely to be varied.

The ramp generator 22 is a double ramp generator including a digital to analog converter. Its d.c. output charges or discharges a capacitor 26 that integrates the charge in the time so as to reach an instant voltage Vc depending upon (1) the previous value of the capacitor voltage, (2) the ramp sign (ascending or descending) and (3) the slope value (controlled by a digital value applied to the input of the ramp generator).

The inputs of the ramp generator are, respectively SN, formed by one bit determining the ramp sign, and PR, formed by several bits, determining the slope of the ramp itself.

For an easier understanding of the operation of the apparatus according to the invention, reference will be made to the diagrams of FIG. 3 that show, schematically and not in scale, some waveforms relating to the regulation of a situation of increased load. The diagrams are interrupted along the time axis in order to make the comparison easier.

Waveforms from I to VIII respectively illustrate the voltage Vc across capacitor C (substantially equal to the voltage of generator G), the line voltage Vr, the rotational speed Vrot of the generator, the reference pulses EXR, the pulses from encoder IE, the value of bit SN, the (analog) value of the ramp slope, and finally the profile of the out of phase tolerance and damping. When the line voltage Vr, the reference frequency and the input power are balanced, the speed of rotation shows only modest oscillations at the time corresponding to reference pulse a, the pulse from the encoder precisely coincides with the IE pulse or is within the allowable limits of phase shift, the ramp sign and slope are not modified and voltage Vc keeps on slightly and gradually decreasing at the minimum slope. After a number of reference pulses (not shown) the speed has increased since the electric power is lower than the mechanical input power.

The difference between the input mechanical power and the electric power supplied to the load has been turned into an additional kinetic energy of the rotating mass thereby causing the speed to increase. As a consequence of such (modest) speed increase, at a certain moment, the pulse from the encoder leads the reference pulse beyond allowable tolerance, as shown at b, and therefore the ramp sign is changed ("−" to "+") but the slope is kept constant at the minimum value. Voltage Vc, (as well as the generated voltage Vg) again starts to rise. While the current increases, the speed gradually decreases and, at time c, speed and phase are almost exactly coincident so that the encoder and reference pulses coincide. The sign and the slope of the ramp stay unchanged so that the voltage across the capacitor 26 (and also the field excitation and the generated voltage), the current and the supplied power continue to slowly rise. At time d the speed of rotation has decreased since the kinetic energy compensated for the gap between the input and output power. The encoder pulse lags the reference pulse beyond the allowable tolerance, the ramp sign changes ("+" to "−") and so on.

In FIG. 3, between the adjacent reference pulses f and g, the line voltage step dropped thereby causing a substantial increase in the potential difference between the generated voltage Vg and the line voltage Vr. Consequently the current and power supplied have been increased thereby causing a large gap with respect to the input power and the difference is turned into kinetic energy slowing down the speed of rotation. The encoder pulse then appreciably lags behind the reference pulse g thereby causing the sign change of the ramp ("+" to "−") and a slope increase that is proportional to the delay between the two pulses. It is to be understood that the scales are not proportional, and as an example, the time windows between the pulses are in the order of a few microseconds, i.e. of several orders of magnitude smaller than the line period.

At pulses h and i the speed continues decreasing and the slope is further increased. At pulse h the speed is still low, but meanwhile the energy balance has reversed; the mechanical angle is still out of phase but the tolerance with respect to the phase shift has increased so that the delay is smaller and the ramp slope decreased. At pulse K the speed has risen, the encoder pulse leads and the ramp is inverted and gradually reduces the oscillation amplitudes to the normal values.

Figure 2:
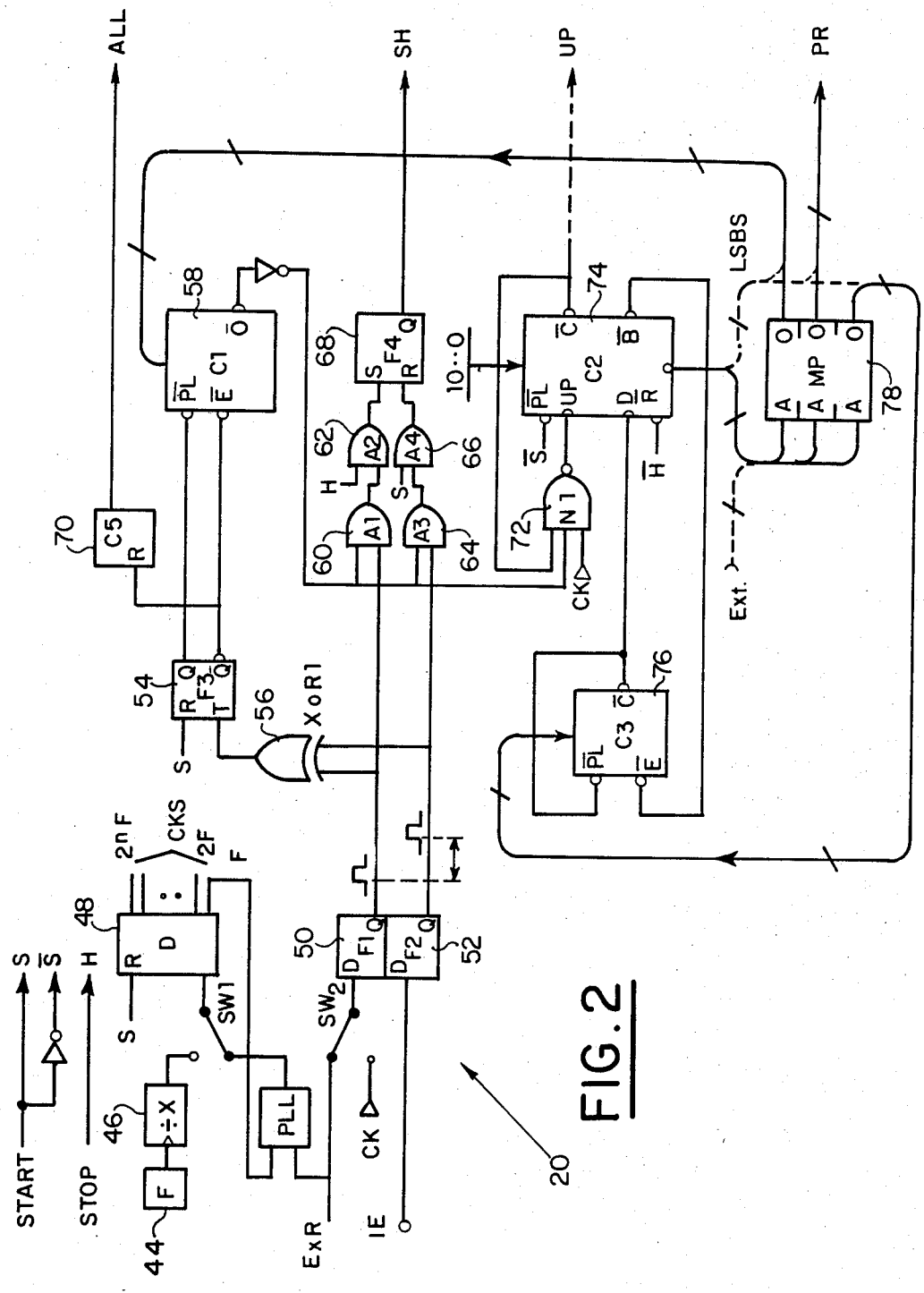

In FIG. 2 there is illustrated a preferred but not limiting embodiment of the logic unit 20 according to the invention. More particularly such unit comprises a circuit of standard C-MOS integrated circuits. The start and stop inputs generate the signals S, H and their inverted $\bar{S}$, $\bar{H}$ in a known manner. A reference frequency generator 44 is connected to the input of a programmable $\div X$ scaler/counter 46 to obtain harmonics of the usual line frequencies. When switch SW1 is in the position shown, a second scaler 48 generates a complete series of harmonics, all powers of 2 of the line frequency and among them the clock pulses CK for the subsequent counters. EXR and IE pulses are synchronized by two bistable flip-flops 50, 52 of D type. The first one of the two pulses changes the state of flip-flop 54 through exclusive OR gate 56, thus enabling the counting input E of programmable counter 58 receiving count pulses on another input (not shown). The second coming pulse resets the bistable flip-flop 54 stopping the counting of counter 58. In case the two pulses are simultaneous the exclusive OR gate 56 does not alter the state of bistable flip flop 54 thanks to its known characteristics. Counter 58 is previously adjusted to the allowable phase shift tolerance, i.e. to a predetermined number of pulses, so that in case the count is not stopped before reaching such preset value, the output $\bar{O}$ becomes activated. Therefore, in case the second pulse is not received within the time window defined by this number of preset pulses, the output $\bar{O}$ is activated and the second pulse is applied through logic gates 60, 62, 64, 66, to the S and R inputs of bistable latch 68 which in turn changes or does not change its state depending upon the logic inputs and its previous state. When bistable 68 receives a pulse at input S through gates 60 and 62, its output Q assumes a high logic value (1) whereas this same output becomes low (0) when the input comes from gates 64 and 66. The output of such bistable is therefore the sign bit SN of the ramp generator 22 shown in FIG. 1. In case the phase shift still persists in the same direction, in spite of the slope and sign changes, bistable 68 does not change the sign. A counter 70 is provided in parallel to counter 58 and its counting continues until the arrival of the second pulse and can possibly reach one or more configurations of the phase shift alarm generating signal, ALL.

The output of counter 58 is further connected via a NAND gate 72 to an up-down counter 74 which, during the presetting, parallely loads an intermediate fixed value, such as 100 . . . 0.

Counter 74 further has an input $\overline{R}$ which resets the output during the stop procedure, two clock inputs CK (UP and DOWN) and the carry $\overline{C}$ and borrow $\overline{B}$ outputs used as a feedback on the inputs to prevent count saturation (overflow). Each time counter 58 detects an excess of phase shift, gate 72 transfers a number of CK pulses proportional to the phase shift to input UP. A third counter loads counter 74 in a continuous manner with a frequency depending upon the damp speed. Counter 74 integrates the phase shift amplitude and this value is damped from counter 76. Under normal conditions the counting from 74 will be near to zero, whereas after a number of neighboring transients or a high step the counting will be maximum. The outputs from counter 74 are led to inputs A of a programmable memory 78 of the ROM, EPROM, etc. type, together with other externally controlled bits to obtain particular characteristic outputs O from memory 78. Outputs O represent the present slope PR and are applied to the ramp generator 22. Outputs O are also applied to counters 58 and 76, as shown. Counter 58 integrates the slope value to save programming time and counter 76 provides the damp speed. Thus, the use of a programmable memory 78 allows for an optimization of each parameter and the application of particular controlling modalities that can possibly be selected (programmed) from outside.

At the start the network computer selects the optimum values for the input power, induction and phase shift. Since all the time constants are known, when the speed of rotation and the phase are next to the optimum, a start signal is produced that selects the ramp sign and parallely loads counter 74 with a fixed initial value. The output from this counter, through memory 78, is led to the ramp generator 22 which supplies a predetermined current to charge the integrating capacitor 26 for a time selected by the computer. Upon reaching a voltage corresponding to the desired initial induction, the generator 12 is connected, at the desired moment, to the line and the double ramp operations begin.

Figure 4:
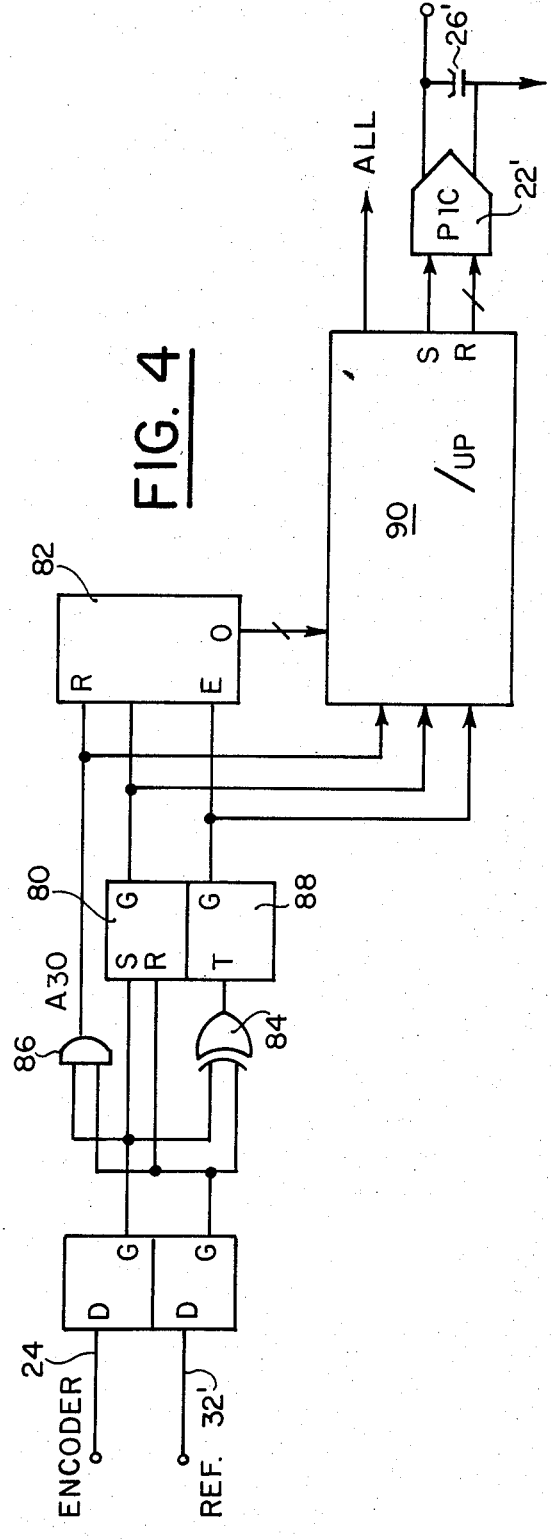
FIGS. 2, 4 and 5 show some embodiments of the control apparatus according to the invention.
Figure 5:
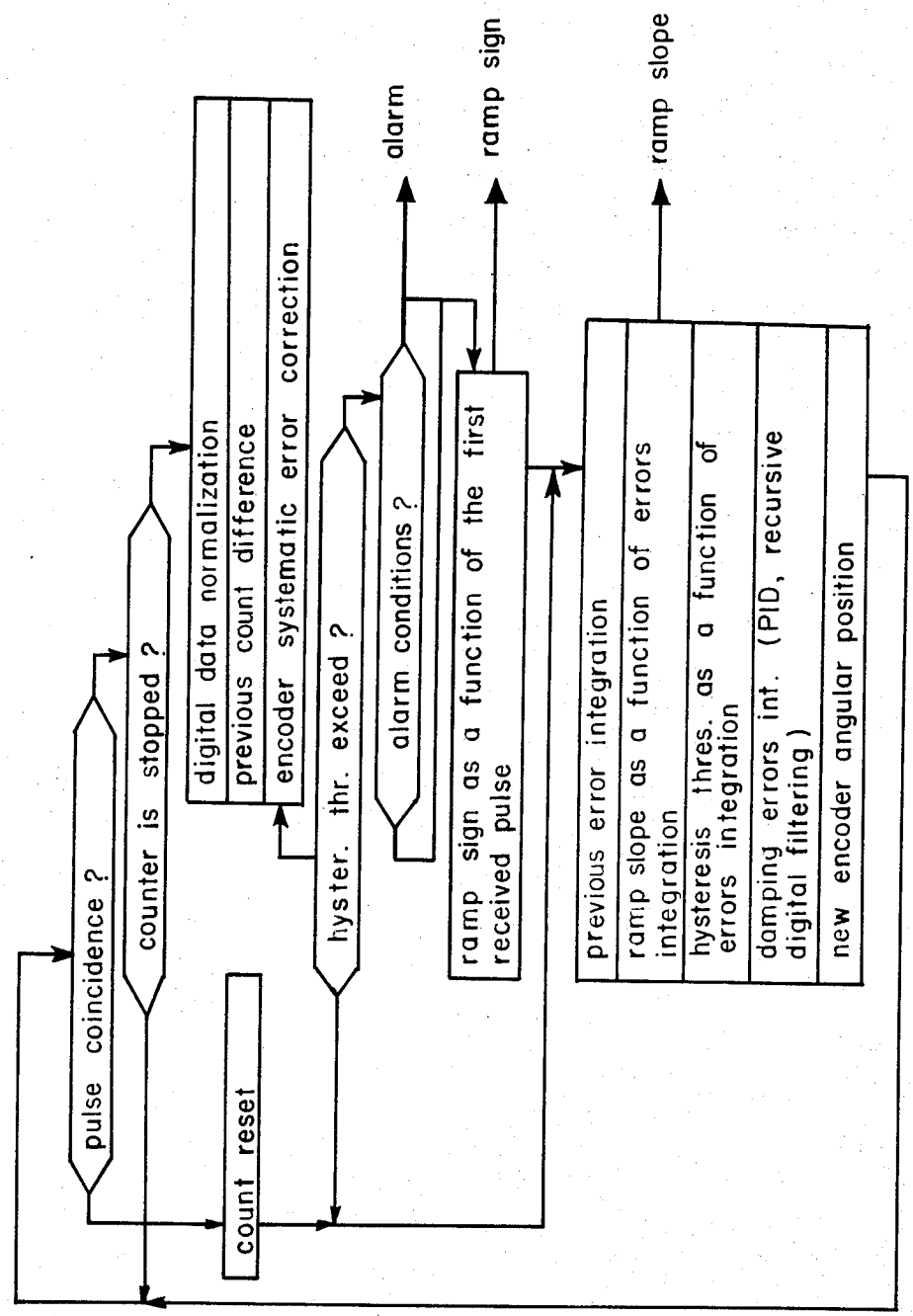

FIGS. 4 and 5 show an alternative embodiment utilizing a microprocessor 90 for carrying out the inventive method. FIG. 4 shows a block diagram whereas FIG. 5 shows a flow chart illustrating the operation, respectively. The phase and/or the speed measurements, as a function of the mechanical angle, can be directly obtained by counting the number of encoder marks passing through the reference time windows, but this method requires expensive encoders. As an alternative an indirect measurement can be obtained by counting the clock pulses, within windows controlled by an encoder pulse and an outer reference. This solution is less expensive.

To obtain a good resolution with modern componets, it is better that the counter be separated from the microprocessor 90, or in any event, be a dedicated counter. In FIG. 4 there is illustrated a possible solution with an outer counter 82 for detecting the particular case of centered phse, i.e. the case where the reference and encoder pulses are in phase. The first arriving pulse, either from the encoder 18 or from the outer reference 32', through the SR latch circuit 80 begins the up-down counting and through the exclusive OR gate 84 and T flip-flop 88 enables the counter 82. The second pulse received by the T flip-flop 88 disables the counter 82. To improve the statistical accuracy it is possible to use the repetitive characteristics of the encoder 18 and the counter 82, storing a number of subsequent counts, reducing the temporal quantization uncertainty (after many revolutions the errors statistically compensate each other). In this case the counter 82 is reset by the AND gate 86 at the coincidence of two pulses, thus eliminating every counting error.

Beyond the parallel inputs from the counter output, microprocessor 90 also receives other signals on single lines and more precisely: the output from the SR latch 80 indicating which one of the signals arrived first, thus saving processing time for the ramp sign; the output from AND gate 86; the state of the counter 82 (pulse coincidence); and the output from the T fip-flop 88 for the data check.

In case the pulses do not coincide when the counting has stabilized, the normalizing is accomplished by complementing and noting the count value. As an example 111100 becomes 000011. The previously stored value is subtracted from the new one to obtain the phase shift. Each angular position of the encoder, due to mounting asymmetries or geometical inaccuracies, exhibits systematic errors that are reduced by means of corrective factors stored for each angular position.

In case the phase shift exceeds the allowable hysteresis threshold, after checking the alarm conditions, the ramp sign is determined as a function of the first received pulse; the absolute value of the phase error is integrated to the preceding damped value. The ramp slope is a function of the previous error integration (a value that may or may not be linear) and a mathematical function and/or a specific value stored in a ROM. The same holds true for the hysteresis threshold. The damping of the error integrtion controlling the preceding parameters, the hysteresis and the slope, can be controlled through several algorithms according to the plant characteristics, such as proportional, derivative digital recursive integral filtering, etc.

Whereas the invention has been particularly illustrated for adjusting the values of the supplied voltage, the same is not limited to this embodiment but can be employed for controlling other quantities too.

The present invention may be embodied in other specific forms without departing from the spirit or essential attributes thereof and, accordingly, reference should be made to the appended claims, rather than to the foregoing specification, as indicating the scope of the invention.

What I claim is:

1. A method for controlling electric power stations equipped with a.c. rotating machines, for electric networks including one or more pairs generator-motor, each generator being individually controlled in the phase locking mode, characterized in that it comprises: generating a pulse sequence related to the quantity to be controlled, generating a reference pulse sequence, detecting the phase shift between corresponding pulses of each sequence, generating a ramp signal having a sign and a slope proportional to the phase shifts between said pulses, integrating said ramp signal and using the integrated signal to control the generator field excitation.

2. A method as claimed in claim 1, wherein the field excitation varies according to a linear ramp and the ramp slope is proportional to the errors.

3. A method as claimed in claim 2, wherein the integrated value is temporally damped.

4. An apparatus for controlling an a.c. rotating machine, of the type having a wound rotor and a variable magnetic field for electric networks including one or more generator-motor pairs, the apparatus being characterized in that it comprises; a reference pulse generator having a frequency and a phase to be tracked; a pulse generating encoder mounted on the mechanical axis of the motor-generator; comparison and processing means receiving as inputs said reference pulses and encoder pulses and having the output connected to a double ramp generator the sign of which is controllable as a function of the relative phase shift between said pulses; an amplifier coupled to the output of the ramp generator modulating the magnetic induction of the generator.

5. An apparatus as claimed in claim 4, characterized in that it provides an integrating capacitor connected at the output of the ramp generator, the voltage of the capacitor being supplied to the amplifier input.

* * * * *